Feb. 21, 1933.    A. G. DANNELL    1,898,426
METHOD OF FABRICATING COMPOSITE METAL ARTICLES
Filed April 26, 1927
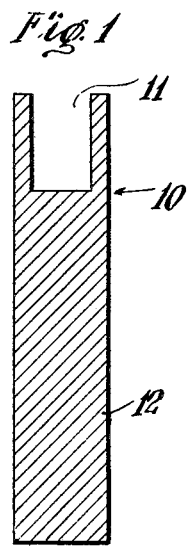
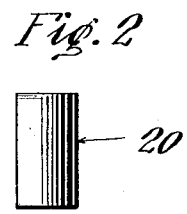
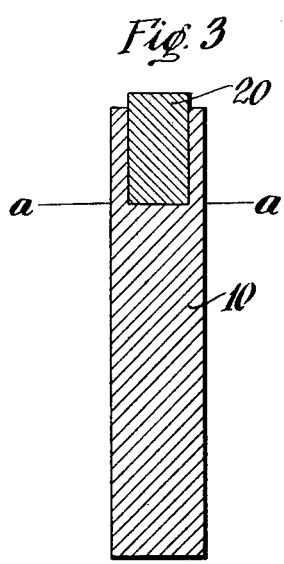
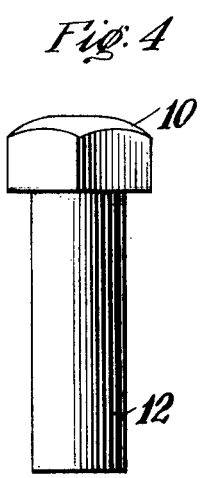
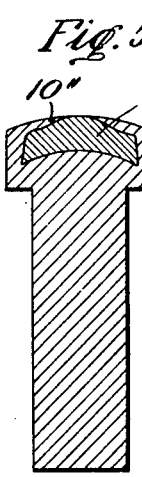
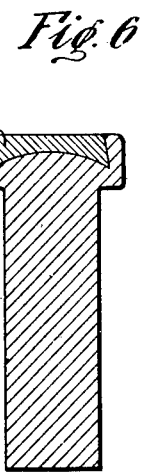

Patented Feb. 21, 1933

1,898,426

UNITED STATES PATENT OFFICE

ARTHUR G. DANNELL, OF NEW YORK, N. Y., ASSIGNOR, BY MESNE ASSIGNMENTS, TO WILCOX-RICH CORPORATION, OF DETROIT, MICHIGAN, A CORPORATION OF MICHIGAN

METHOD OF FABRICATING COMPOSITE METAL ARTICLES

Application filed April 26, 1927. Serial No. 186,611.

My present invention relates to methods of fabricating composite metal articles, and aims to devise methods of the general character specified which are simple, which may be readily, conveniently and economically practiced, which are readily adaptable for a wide variety of articles of the general character specified, and which result in superior lines of articles characterized by their ruggedness, their accuracy, their neatness and attractiveness in appearance, their usefulness for the intended purpose and their relative cheapness and long life. Other objects and advantages of the present invention will in part be pointed out in detail hereinafter and will in part be obvious to those skilled in the art to which the present invention relates.

In the accompanying specification I shall describe, and in the annexed drawing more or less diagrammatically illustrate, an illustrative embodiment of the methods of the present invention. It is, however, to be clearly understood that my invention is not limited to the specific embodiment thereof herein described and diagrammatically illustrated for purposes of illustration merely. It is further to be understood that the article described herein as resulting from the practice of the aforesaid illustrative embodiment of the method of the present invention forms no part of the present invention, being fully claimed in a copending application of mine filed of even date herewith and entitled "Composite metal articles."

Referring to the drawing, wherein I have more or less diagrammatically illustrated the aforesaid illustrative embodiment of the method of the present invention and wherein I have, at the same time, illustrated one form of article resulting from the practice of the aforesaid illustrative embodiment of the method of the present invention, which article is claimed in my copending application above referred to:

Fig. 1 is a longitudinal section of one of the members entering into the fabrication of an article which may be made in accordance with the aforesaid illustrative embodiment of the method of the present invention;

Fig. 2 is a side elevational view of another member entering into the fabrication of said article in accordance with said embodiment of the method of the present invention;

Fig. 3 is a longitudinal sectional view showing such two members in assembled relation prior to the fabrication of the composite article itself, the line a—a indicating the approximate extent to which the assembled members are preferably heated for the forging operation;

Fig. 4 is a view in side elevation showing the article after it has been forged but before it has been finished;

Fig. 5 is a longitudinal sectional view of the article shown in Fig. 4 after the forging operation but before the finishing operation; and Fig. 6 is a view, partly in longitudinal section and partly in elevation, showing the completed composite metal article formed by the practice of the aforesaid illustrative embodiment of the method of the present invention.

Referring now to the aforesaid illustrative embodiment of the method of the present invention, and more particularly to the drawing more or less diagrammatically illustrating the same and illustrating, at the same time, the article resulting from the practice of the aforesaid illustrative embodiment of the method of the present invention, in practicing the aforesaid illustrative embodiment of the method of the present invention, I first provide a member in the form of a main body portion, for example, in the form of a rod, cylinder or the like, made of one metal, such as ordinary or soft steel, and constituting one member of the plurality of members from which the aforesaid article may be made in accordance with the principles of the method of the present invention.

As indicated by reference character 11, the member 10 is provided adjacent one end thereof with a cavity or depression, as by being cored, drilled or otherwise provided with such a cavity or depression, the purpose of such cavity or depression being to receive another one of the metal members which go to make up the composite metal article which is the result of the practice of the aforesaid illustrative embodiment of the method of the present invention.

At 20 I have indicated a second member which goes to make up the composite metal article now being described as resulting from the practice of the aforesaid illustrative embodiment of the method of the present invention. This second metal member may be in the form of a slug, rod or cylinder, of such shape and dimensions as to fit quite snugly into the cavity or depression 11 in the end of the member 10. A snug fit is desirable so that as much air as possible may be excluded from the parts to be forged so that the union between the members will be as nearly perfect as possible and so that the metal of the various members adjacent such union be in the best condition possible. The member 20 is preferably of a different metal from the member 10, as by being of hard or tool steel, for example. This is so that it may provide a working or impression surface in the completed article, as will be described in greater detail later in this specification.

The slug or other member 20 is now inserted in the cavity or depression 11 in the member 10. The assembled members are now heated to a forging temperature. Preferably this is done by limiting the heating to a forging temperature to that portion only of the assembled members which is desired to be forged, as far as this may be feasible. For example, in the case of the article now being described for purposes of illustration merely, the assembled members are preferably heated down only as far as the line a—a in Fig. 3 of the drawing. This localized heating may best be effected in the type of machine shown and described and also claimed by me in a copending application of mine filed of even date herewith and entitled "Electrical heating appliances," using for this purpose the method shown and described and also claimed by me in a copending application of mine filed of even date herewith and entitled "Electrical heating methods." In this way heat is economized, the substantially unheated portion of the assembled members serving as a satisfactory foundation or support for the portion to be forged, and a much cleaner, neater and more satisfactory forging job may be brought about.

The assembled members having been heated to the forging temperature, as already described, preferably with the forging temperature being localized in that portion of the assembled members which it is desired to forge, the forging operation may now be carried out; as by having a header or die member come down with the necessary degree of pressure upon that portion of the assembled members which has been heated to a forging temperature. For this purpose the means illustrated in the two copending applications last referred to may be very conveniently and successfully employed.

In the practice of the aforesaid illustrative embodiment of the method of the present invention in the fabrication of the form of article now being described, which article is intended to constitute and to be employed as a tappet screw, for example, and preferably in each form of article fabricated according to the principles of the methods of the present invention, I desire, as illustrated in Figs. 5 and 6 of the drawing, that the forged insert member, here designated by reference character 20′, within the forged portion 10′ of the member 10, shall be fixedly retained in place within the portion 10′ by providing such portion 10′ during the forging operation with an overhanging lip portion 10″ which is automatically formed when the head portion 10′ and the contained insert 20′ are given the shape illustrated in the drawing.

This arrangement locks, by an automatic action, during the forging operation, th insert 20′ within the forged head portion 10′ of the member 10. The overhanging lip portion 10″ will be in the form of an annular edge portion which will securely and fixedly retain the forged insert member 20′ within the forged head portion 10′. This is an important feature of the present invention and may be utilized where, as may often be the case, several inserts are desired to be produced in a body portion, for example, one such insert at each end of the member 10 similar to the insert 20 within a similar cavity or depression 11 at each end of the member 10 or its equivalent. It may here be stated that the features of the methods of the present invention may be applied in the fabrication of composite metal members consisting of two, three, four or more parts, with as many inserts as desired, dependent upon the character and desired structural features and properties of the final composite metal articles intended to be produced in accordance with the principles of the methods of the present invention.

The forging operation, while it may, and preferably, but not necessarily, does leave a portion of the surface of the forged insert member 20′ exposed within the lip portion 10″ of the forged head portion 10′ of the member 10, will ordinarily not leave such surface in a true or accurate condition. For this and for other reasons, it is desirable that the forged composite metal article be given a finishing operation. For this purpose, the top surface may be ground off to provide a true bearing or impression surface surrounded by the lip portion 10″, while the lower portion may be threaded, as indicated by reference character 12, to serve the purpose of a tappet screw, as already suggested above. Any other desired finishing operation, dependent upon the specific character of the article intended to be produced in accordance with the method of the present invention, may be resorted to to place such article in its desired final condition.

This completes the description of the aforesaid illustrative embodiment of the methods of the present invention. It will be noted that such methods are simple, may be readily, conveniently and economically practiced, and are readily adaptable for a wide variety of articles of various types. Such articles themselves are characterized by their simplicity in construction, the ease, convenience and economy with which they may be fabricated, and their strength and long life in use. Other objects and advantages of the methods of the present invention will readily occur to those skilled in the art to which the present invention relates.

What I claim as my invention is:

1. The method of fabricating a composite metal article which comprises providing a blank of soft steel with a cylindrical cavity at one end thereof, inserting into such cavity an insert of tool steel and thereafter simultaneously forging the portion of said blank containing said insert and the contained insert so as to form a head on said blank and to leave exposed a portion of said insert.

2. The method of fabricating a composite metal article which comprises providing a blank of soft steel with a cylindrical cavity at one end thereof, inserting into such cavity an insert of tool steel, and thereafter simultaneously forging the portion of said blank containing said insert, and the contained insert, so as to provide said portion of said blank with a head having an inturned lip overhanging an exposed portion of said insert.

3. The method of fabricating the composite metal article which comprises providing a blank of soft steel with a cylindrical cavity at one end thereof, inserting into such cavity an insert of tool steel, and thereafter simultaneously forging the portion of said blank containing said insert and the contained insert.

4. The method of fabricating a composite metal article which comprises providing a blank of soft steel with a cylindrical cavity at one end thereof, inserting into such cavity an insert of tool steel, then simultaneously forging the portion of said blank containing said insert and the contained insert so as to provide said portion of said blank with a head having an inturned lip overhanging an exposed portion of said insert, and thereafter grinding off the forged end of said blank so as to provide an exposed ground surface of said insert, surrounded by an exposed ground surface of said head portion of said blank.

5. The method of fabricating a composite metal article which comprises providing a blank of soft steel with a cylindrical cavity at one end thereof inserting into such cavity an insert of tool steel, then simultaneously forging the portion of said blank containing said insert and the contained insert, and thereafter grinding off the forged end of said blank so as to provide an exposed ground surface of said insert surrounded by an exposed ground surface of said surrounding portion of said blank.

6. The method of fabricating a composite metal article which comprises providing a blank of soft steel with a cylindrical cavity at one end thereof, inserting into such cavity an insert of tool steel, then simultaneously forging the portion of said blank containing said insert and the contained insert so as to form a head on said blank and to leave exposed a portion of said insert, and thereafter grinding off the forged end of said blank so as to provide an exposed ground surface of said insert surrounded by an exposed ground surface of said head portion of said blank.

7. The process of making tappets which includes inserting a block of facing metal in an endwise opening pocket in a rod blank and hot forging this assembly to simultaneously spread the block and adjacent portions of the blank to form a head and embed the flattened facing metal in the spread portion of the blank.

In testimony whereof I have signed my name to this specification this 22nd day of April, 1927.

ARTHUR G. DANNELL.